(12) United States Patent
Bhat et al.

(10) Patent No.: US 9,208,224 B2
(45) Date of Patent: *Dec. 8, 2015

(54) BUSINESS CONTENT HIERARCHY

(71) Applicant: International Business Machines Corporation, Armonk, NY (US)

(72) Inventors: Sumana S. Bhat, Bangalore (IN); Karen L. B. Brown, Fayetteville, NC (US); Ankur Jain, Bangalore (IN); Bipin K. Joshi, Pune (IN); Biplav Srivastava, Noida (IN); Srikanth G. Tamilselvam, TamilNadu (IN); Terrence E. White, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/715,021

(22) Filed: May 18, 2015

(65) Prior Publication Data

US 2015/0248477 A1    Sep. 3, 2015

Related U.S. Application Data

(63) Continuation of application No. 13/248,200, filed on Sep. 29, 2011.

(51) Int. Cl.
*G06F 17/30* (2006.01)

(52) U.S. Cl.
CPC .... *G06F 17/30731* (2013.01); *G06F 17/30294* (2013.01); *G06F 17/30398* (2013.01); *G06F 17/30864* (2013.01); *G06F 17/30946* (2013.01)

(58) Field of Classification Search
CPC .......... G06F 17/3071; G06F 17/30731; G06Q 10/10
See application file for complete search history.

(56) References Cited

U.S. PATENT DOCUMENTS

| 7,523,124 | B2 | 4/2009 | Lavdas et al. |
|---|---|---|---|
| 7,558,778 | B2 | 7/2009 | Carus et al. |
| 7,900,134 | B2 | 3/2011 | Ardeleanu et al. |
| 8,321,805 | B2 | 11/2012 | Tien et al. |
| 8,719,769 | B2 | 5/2014 | Castellanos et al. |
| 9,069,846 | B2 | 6/2015 | Bhat et al. |
| 2003/0009564 | A1 | 1/2003 | Eckel |
| 2007/0255715 | A1 | 11/2007 | Li et al. |

(Continued)

FOREIGN PATENT DOCUMENTS

EP    2246811    11/2010

OTHER PUBLICATIONS

Semantic Alignment, Why it matters, Collibra Vision paper, 11 pages, 222.collibra.com, 2008.

(Continued)

*Primary Examiner* — Scott A Waldron
(74) *Attorney, Agent, or Firm* — Schmeiser, Olsen & Watts; John Pivnichny (57) ABSTRACT

A harvesting method and system is provided. The method includes extracting from a plurality of documents, content. The content is published in external glossaries. The content is arranged in a business content hierarchy and the business content hierarchy is published in a specified format. The business content hierarchy is enabled with respect to a plurality of projects. The content and business content hierarchy are updated and the updated content is arranged in the updated business content hierarchy.

20 Claims, 11 Drawing Sheets

(56) References Cited

U.S. PATENT DOCUMENTS

| | | |
|---|---|---|
| 2008/0104032 A1 | 5/2008 | Sarkar |
| 2008/0242279 A1 | 10/2008 | Ramer et al. |
| 2008/0301120 A1 | 12/2008 | Zhu et al. |
| 2013/0086128 A1 | 4/2013 | Bhat et al. |

OTHER PUBLICATIONS

Office Action (Mail Date Jun. 18, 2012) for U.S. Appl. No. 13/248,200, filed Sep. 29, 2011.

Amendment filed Aug. 22, 2012 in response to Office Action (Mail Date Jun. 18, 2012) for U.S. Appl. No. 13/248,200, filed Sep. 29, 2011.

Office Action (Mail Date Aug. 1, 2013) for U.S. Appl. No. 13/248,200, filed Sep. 29, 2011.

Amendment filed Oct. 31, 2013 in response to Office Action (Mail Date Aug. 1, 2013) for U.S. Appl. No. 13/248,200, filed Sep. 29, 2011.

Notice of Allowance (Mail Date Feb. 25, 2015) for U.S. Appl. No. 13/248,200, filed Sep. 29, 2011.

| Finance | Business Content Handler |
|---|---|
| Search | |
| Export Import | |

Hierarchical Order

◇ Business Processes ( 94 )
◇ Concepts ( 6126 )
◇ Metrics ( 13 )
◇ Rules ( 6 )
  Rules 1
  Rules 2
  Rules 3
  Rules 4
  Rules 5
  Rules 6

Alphabetical Order

- A F C A R S Permanancy Goal Code
- A S A Agency Code Text
- A S A Sub Agency Code Text
- Abscond Indicator
- Academic Program Text
- Academic Term Length Quantity
- Academics
- Access Control Level Code Value
- Accompanied by Family Indicator
- Accomplice Association
- Acknowledgment Data Rules -> Rules4 :

Description : Determine more OCR request needed

Business Object :
LPN – License plate number

IDENTIFICATION_STEP – Identification step. For OCR this is the OCR engine number LPN–LPN confidence level indicator PLATE_ISSUER – Plate issuer or country code PLATE_ISSUER_CONFIDENCE–plate issuer confidence level indicator RESULT_STATUS–Result status IDENTIFICATION_RESULT_LIST–Include all identification results got by detection event ID. Including roadside OCR result Rule Representation : If Roadside OCR is unidentified. (Ref RID03 OCR Identification Rules) And Identification step is Roadside OCR. Then Need secondary OCR request Rule Action : More OCR Request Source : ITS Rule Catalog Doc1

```
<bch>
    <contentCategory id="type-core">
        <categoryName> Metrics</categoryName>
        <categoryMembers id="1">
            <contentitem id="1"
                <name> Average distance travelled</name>
                <description>Average distance travelled
                    in a day</description>
                <source>... </source>
                <annotation> ... </annotation>
            <contentitem>

<categoryMembers>
    <contentCategory
<bch>
```

BUSINESS CONTENT HIERARCHY

This application is a continuation application claiming priority to Ser. No. 13/248,200 filed Sep. 29, 2011, now U.S. Pat. No. 9,069,846, issued Jun. 30, 2015.

FIELD

The present invention relates to a method and associated system for creating a business content hierarchy.

BACKGROUND

Managing data typically comprises an inaccurate process with little flexibility. Data management within a system typically includes a complicated process that may be time consuming and require a large amount of resources. Accordingly, there exists a need in the art to overcome at least some of the deficiencies and limitations described herein above.

SUMMARY

The present invention provides a method comprising: extracting, by a computer processor of a computing system from a plurality of documents, content; publishing, by the computer processor, the content in external glossaries; arranging, by the computer processor, the content in a business content hierarchy; publishing, by the computer processor, the business content hierarchy in a specified format; enabling, by the computer processor, the business content hierarchy in a plurality of projects; updating, by the computer processor, the content and the business content hierarchy; and arranging, by the computer processor, the updated content in the updated business content hierarchy.

The present invention provides a computing system comprising a computer processor coupled to a computer-readable memory unit, the memory unit comprising instructions that when executed by the computer processor implements a method comprising: extracting, by the computer processor from a plurality of documents, content; publishing, by the computer processor, the content in external glossaries; arranging, by the computer processor, the content in a business content hierarchy; publishing, by the computer processor, the business content hierarchy in a specified format; enabling, by the computer processor, the business content hierarchy in a plurality of projects; updating, by the computer processor, the content and the business content hierarchy; and arranging, by the computer processor, the updated content in the updated business content hierarchy.

The present invention provides a computer program product, comprising a computer readable storage device storing a computer readable program code, the computer readable program code comprising an algorithm that when executed by a computer processor of a computing system implements a method, the method comprising: extracting, by the computer processor from a plurality of documents, content; publishing, by the computer processor, the content in external glossaries; arranging, by the computer processor, the content in a business content hierarchy; publishing, by the computer processor, the business content hierarchy in a specified format; enabling, by the computer processor, the business content hierarchy in a plurality of projects; updating, by the computer processor, the content and the business content hierarchy; and arranging, by the computer processor, the updated content in the updated business content hierarchy.

The present invention advantageously provides a simple method and associated system capable of managing data.

DETAILED DESCRIPTION

Figure 1:
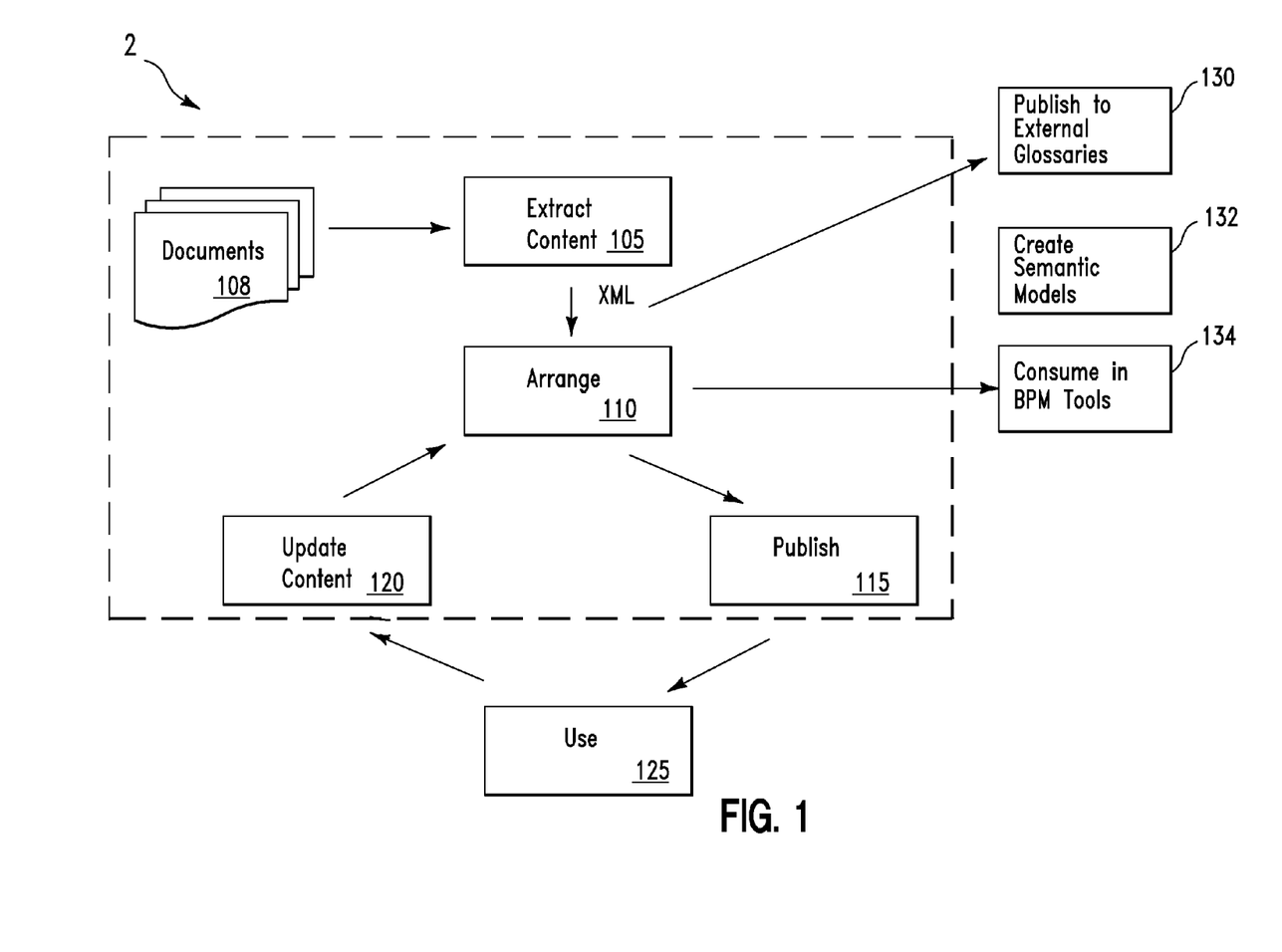
FIG. 1 illustrates a system for creating a business content hierarchy, in accordance with embodiments of the present invention.

FIG. 1 illustrates a system 2 for creating a business content hierarchy, in accordance with embodiments of the present invention. A business content hierarchy (BCH) is defined herein as a knowledge/data structure for organizing information in an intuitive structure (e.g., a hierarchical tree). System 2 comprises a software application/tool 100 for providing domain-specific content (comprising concepts, business rules, metrics, and business processes for IT professionals (e.g., software architects and developers)). Software application/tool 100 structures content based on a BCH. Software application/tool 100 allows a user to browse relevant and authoritative content and additionally view its evolution over different projects. A user may: select a specific subset (of content) that may be used in a project, enhance and export the subset, and re-import additional content to reconcile with master content. 1. Software application/tool 100 allows a user to formalize domain-specific content. In order to formalize content of a domain, concepts (in glossaries) are identified. For example, business processes, metrics, and business rules may comprise key content types that require sharing among peers. Software application/tool 100 enables an automated method in which public documents (such as, inter alia, RFPs, tenders, papers, etc) are collected and content is extracted from the public documents. Software application/tool 100 enables a process for managing domain information. For example, in a case associated with traffic data, concepts, processes, metrics, and business rules are identified. Concepts comprise key entities in a domain. Processes comprise activities performed by the concepts. Metrics comprise a measurement of the activities. Rules comprise behavioral guidelines used to manage the activities. Software application/tool 100 manages this information so that concepts, processes, metrics, and rules are arranged in a hierarchical manner such that each element may be explored individually.

Software application/tool 100 comprises an extract module 105, an arrange module 110, a publish module 115, a use module 125, and an update content module 120. Extract module 105 extracts content from documents 108 (e.g., PDF documents, word processing documents, spreadsheet documents, etc). Arrange module 110 arranges the content (and updated content) in a business content hierarchy structure and optionally: publishes the content in external glossaries, generates semantic models, and/or consumes the content in business process management (BPM) tools. Publish module 115 publishes the business content hierarchy in a specified format by any of the following methods:

1. Translating an XML version of the business content hierarchy into a DHTML format using an XSL process and displaying the content as a tree structure or an alphabetical structure.

2. Translating an XML version of the business content hierarchy into a DHTML format using an XSL process and generating a document comprising the content presented as a tree structure or an alphabetical structure.

3. Performing a read only operation (e.g., searching, zooming, highlighting, etc) associated with an XML version of the business content hierarchy and retrieving details associated with the content.

Use module 125 enables the business content hierarchy for use in a plurality of projects. Update content module 120 updates the content and the business content hierarchy using any of the following methods:

Method 1
1. Loading a selected file associated with the content.
2. Translating an XML version of the selected file into a DHTML format using an XSL process;
3. Importing additional content associated with the selected file.

Method 2
1. Loading selected node content associated with the content.
2. Applying pagination to the selected node content.
3. Presenting (via an explorer export window) business content of the selected node content.
4. Receiving (from a user) a selection for specific content of the business content.
5. Exporting (to an external location) the specific content.

Method 3
1. Loading a selected file associated with the content.
2. Translating an XML version of the selected file into a DHTML format using an XSL process;
3. Adding additional content associated with the selected file.

Figure 2:
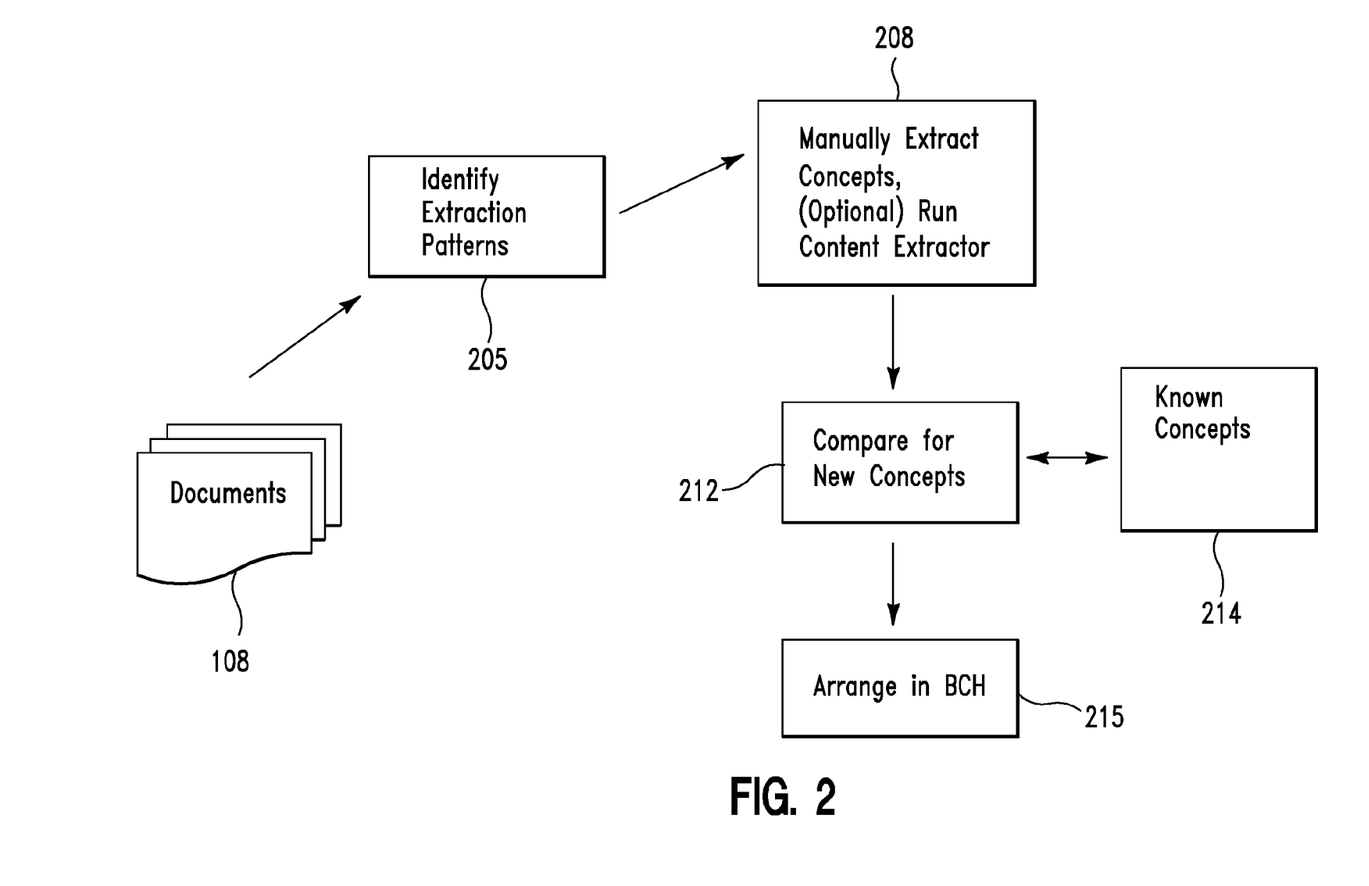
FIG. 2 illustrates an algorithm detailing a process flow enabled by the extract module of FIG. 1, in accordance with embodiments of the present invention.

FIG. 2 illustrates an algorithm detailing a process flow enabled by extract module 105 of FIG. 1, in accordance with embodiments of the present invention. In step 205, text analytics are used to identify extraction patterns to obtain concepts from documents 108. In step 208, metrics and business rules are extracted in accordance with the identified extraction patterns. In step 212, the extracted concepts are compared to known concepts (retrieved in step 214) to identify new concepts. In step 215, the new concepts are arranged in the BCH.

FIGS. 3A-3F describe an implementation example for creating a business content hierarchy enabled by system 2 of FIG. 1, in accordance with embodiments of the present invention. In the implementation example described by FIGS. 3A-3E, a user A enables a software application/tool (e.g., software application/tool 100) to locate specified content associated with financial aspects for traffic projects and how a traffic system may fund the traffic projects from parking revenues.

Figure 3A:
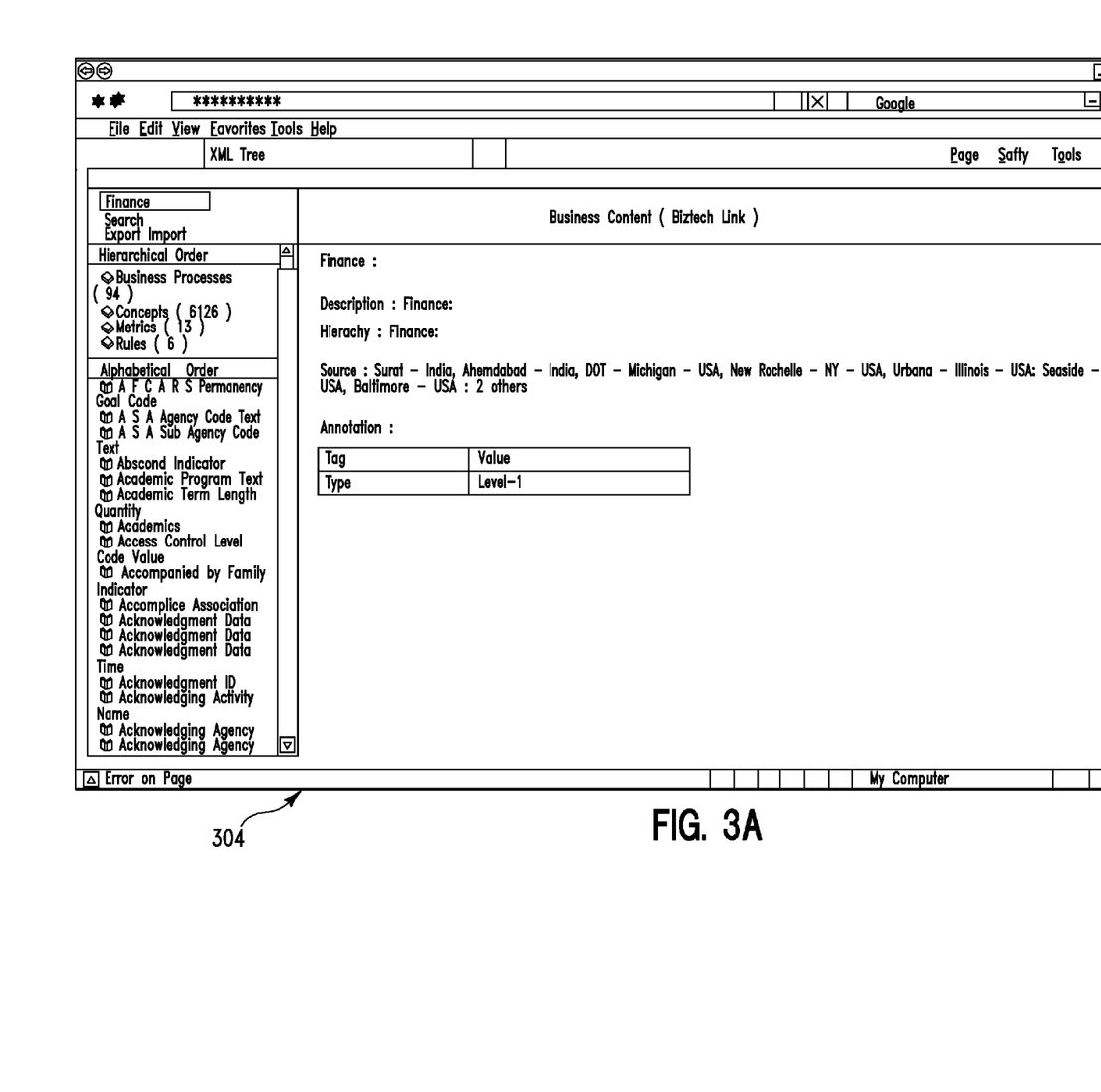
FIGS. 3A-3F describe an implementation example for creating a business content hierarchy enabled by the system of FIG. 1, in accordance with embodiments of the present invention.

FIG. 3A illustrates a screen shot 304 used for searching for a finance concept. Screen shot 304 illustrates a large number of concepts and business processes and a small number of metrics and business rules.

Figure 3B:
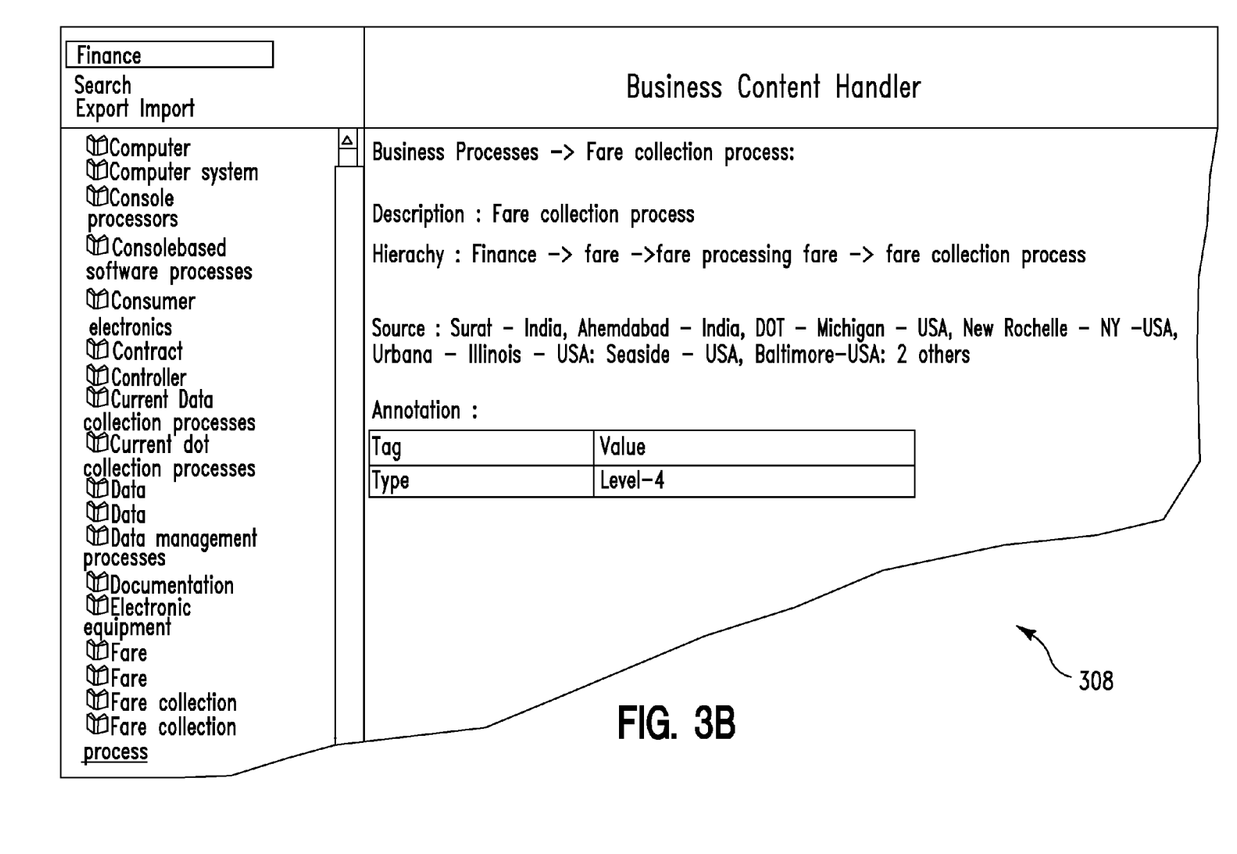

FIG. 3B illustrates a screen shot 308 used for browsing a fare collection process.

Screen shot illustrates a fourth level process under finance, fare, and fare processing.

Figure 3C:
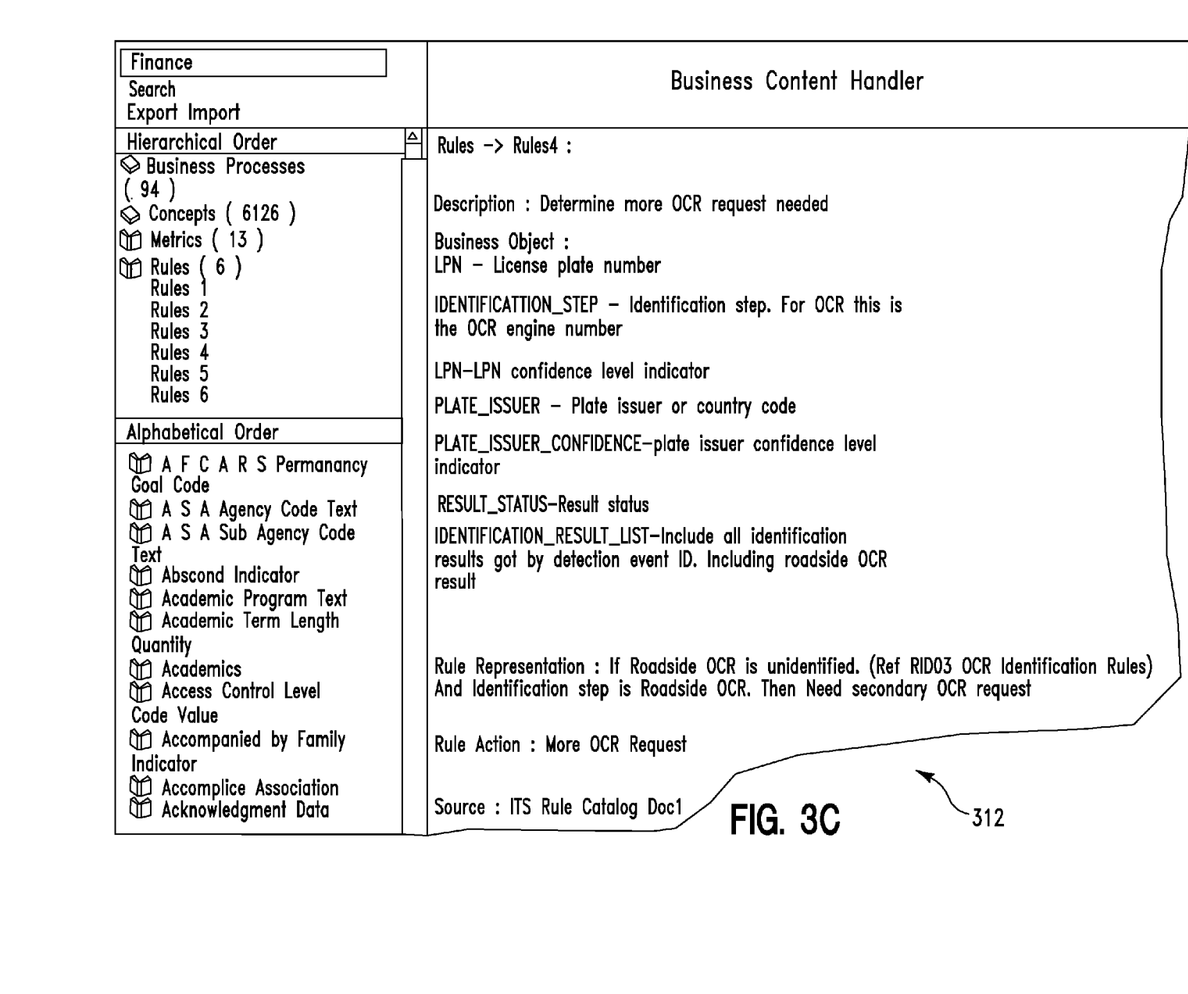

FIG. 3C illustrates a screen shot 308 used for determining details associated with a license plate number recognition business rule.

Figure 3D:
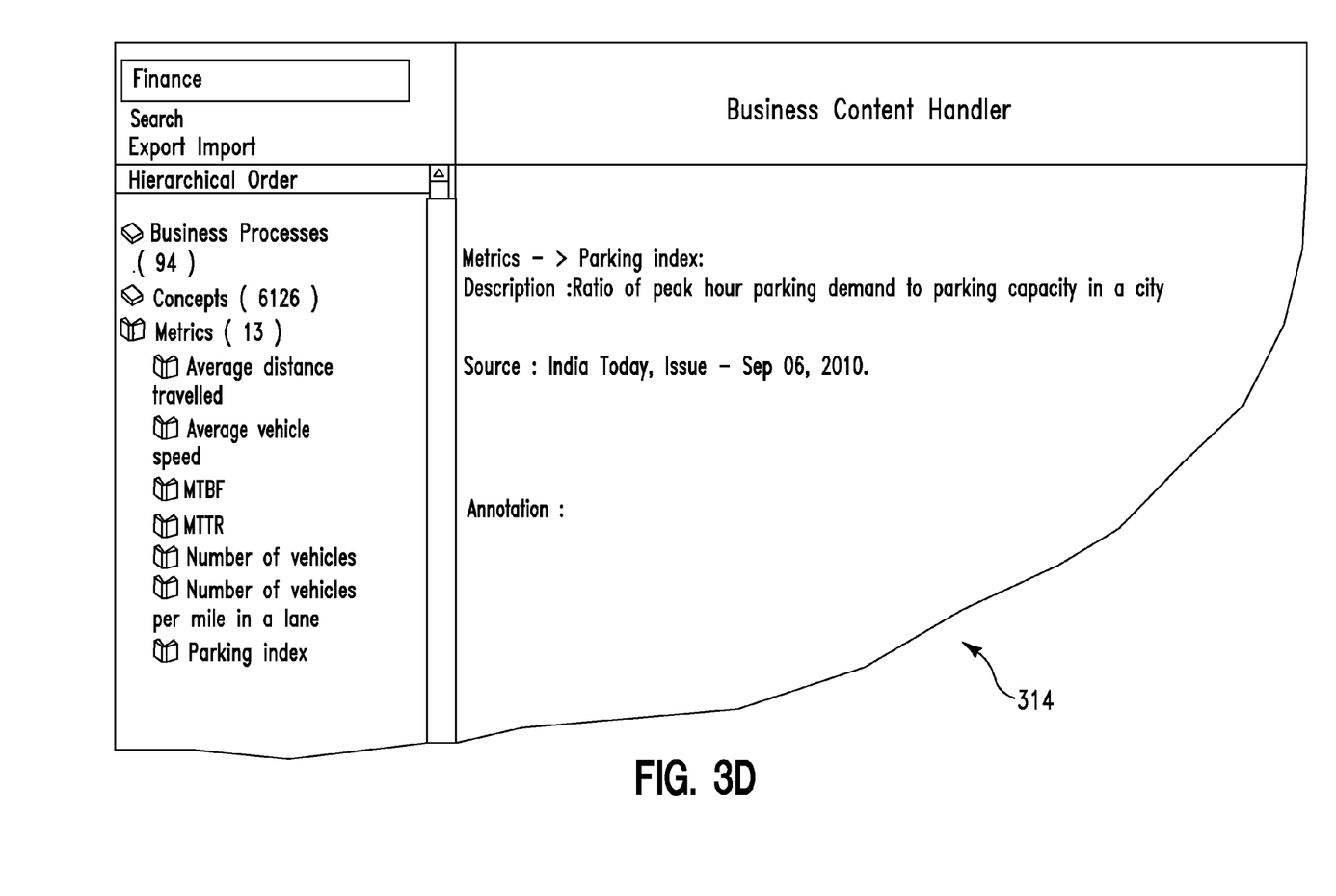

FIG. 3D illustrates a screen shot 314 used for determining metrics related to finance and parking (e.g., a parking index). Once user A has identified a content of interest, the content of interest may be may be selected and exported for project usage.

Figure 3E:
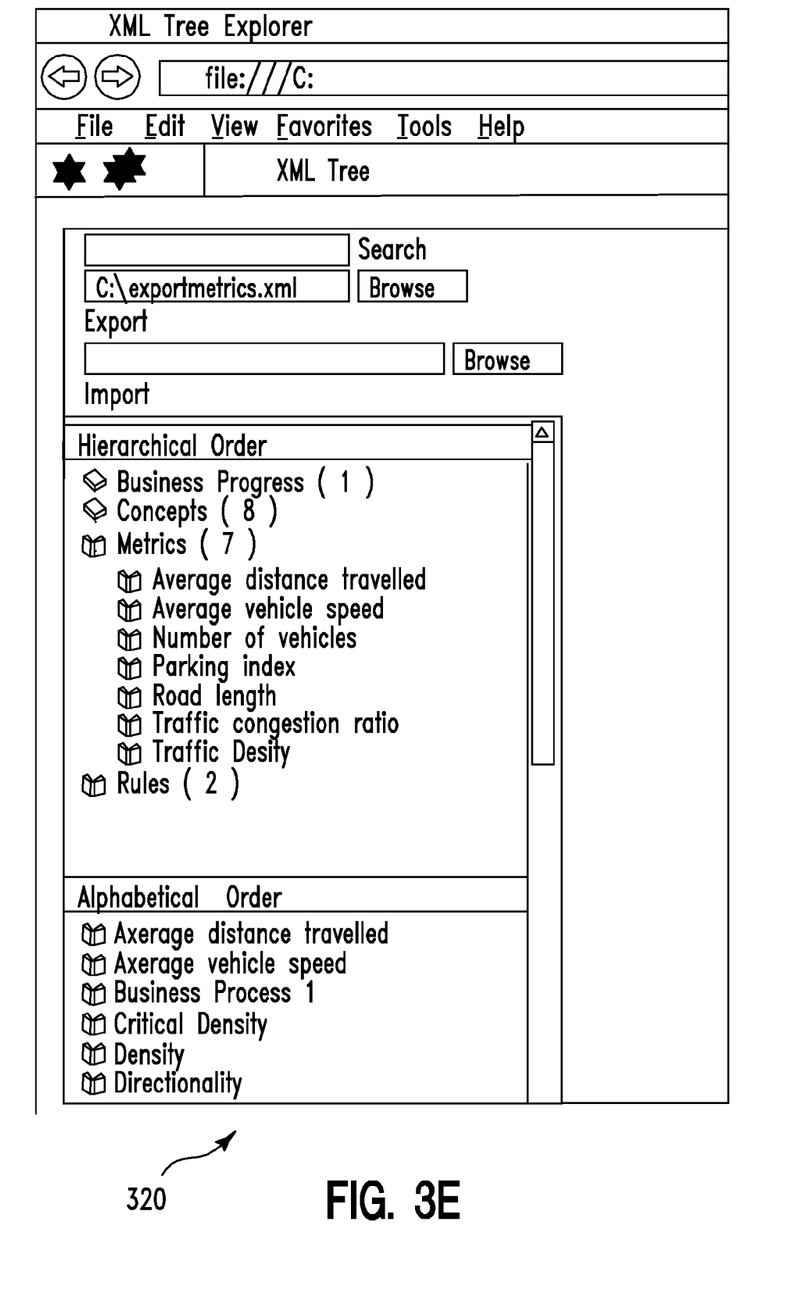
Figure 3F:
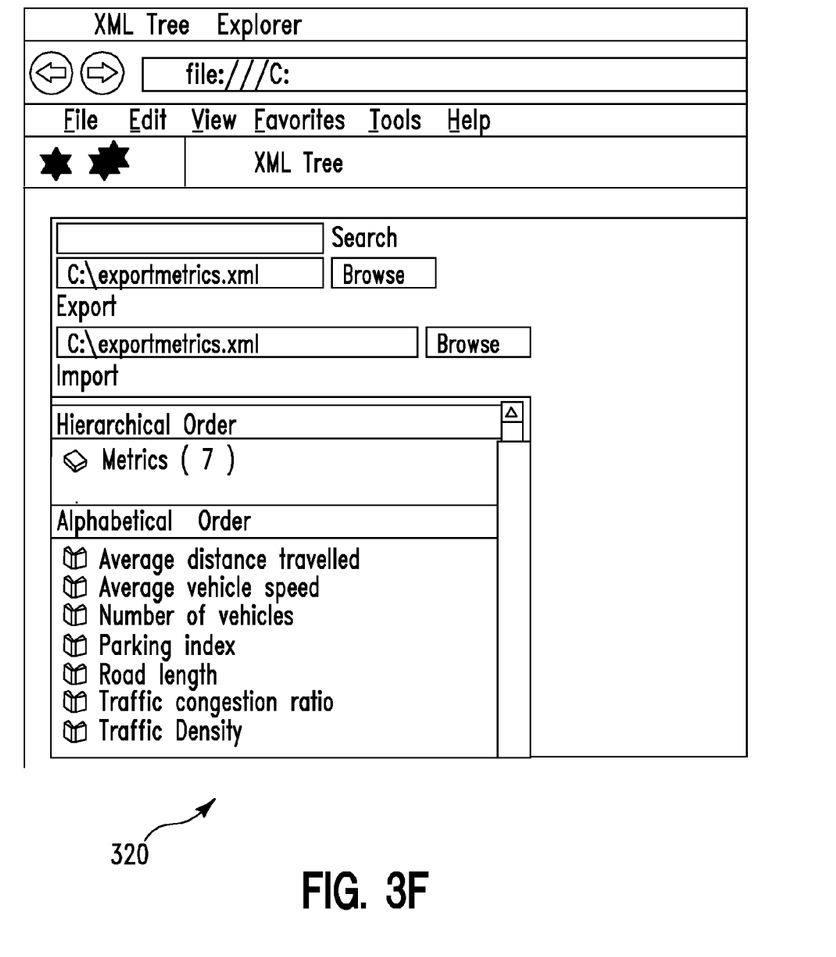

FIGS. 3E and 3F illustrate a screen shot 320 used for exporting, importing, and merging metrics (e.g., seven metrics illustrated in FIG. 3E). The metrics are then imported into the context of any identified content. The software application/tool allows for importing and merging of content. Additionally, software application/tool may be enabled to merge content exported from a completed project back with content of a reference software application/tool. The software application/tool enables a starting point for content exploration in a traffic domain (immediately). A content source and content details are identified.

Figure 4:
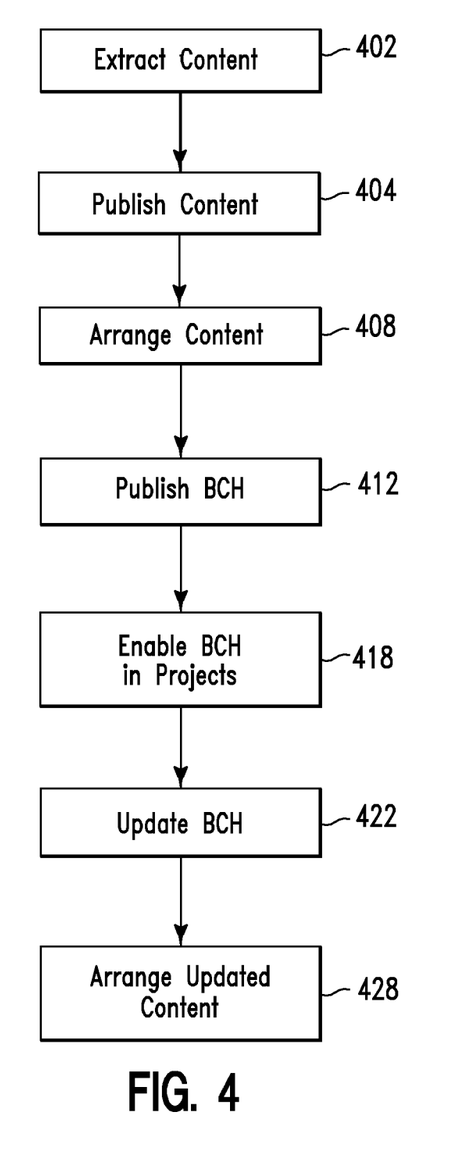
FIG. 4 illustrates a flowchart describing an algorithm used by the system of FIG. 1 for creating a business content hierarchy, in accordance with embodiments of the present invention.

FIG. 4 illustrates a flowchart describing an algorithm used by system 2 of FIG. 1 for creating a business content hierarchy, in accordance with embodiments of the present invention. In step 402, a computer processor of a computing apparatus extracts (from a document(s)) content. In step 404, the computer processor publishes the content in external glossaries. In step 408, the computer processor arranges the content in a business content hierarchy. In step 412, the computer processor publishes the business content hierarchy in a specified format. In step 418, the computer processor enables the business content hierarchy for use in a plurality of projects. In step 422, the computer processor updates the content and the business content hierarchy. In step 428, the computer processor arranges the updated content in the updated business content hierarchy.

Figure 5:
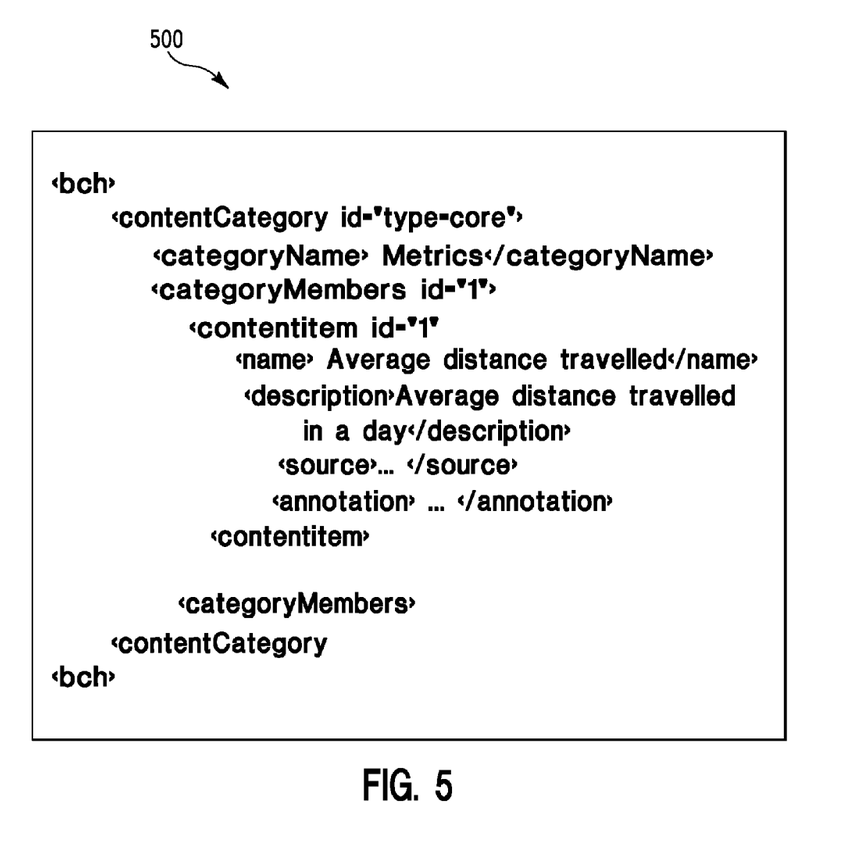
FIG. 5 illustrates an implementation example of a BCH represented in XML, in accordance with embodiments of the present invention.

FIG. 5 illustrates an implementation example of a BCH 500 represented in XML, in accordance with embodiments of the present invention. BCH 500 represents each type of content in a separate category. For example, a category type "<contentCategory>" comprises Metrics content. Members of a category are represented in "<categoryMembers>". Each metric (i.e., a content item) is associated with a "<contentItem>". Additionally, a source for the content (i.e., where the content was obtained or extracted from) "<annotation>" comprises a place-holder for providing extended information about the content. BCH 500 may be used to specify relationships among content items. For example:

1. Business processes: process ID based relationships (APQC ID)
2. Concepts: parent IDs, dependent IDs BCH 500 may be used to select content based on an annotation flag. For example:
1. inScope: true/false (default: true)

BCH 500 may be used for annotation by marking reused or not. For example:
1. isReused: true/false (default: false)

BCH 500 may be used for annotaton by marking standard or newly created in a project.

For example:
1. isNew: tru/false (default: false)

Figure 6:
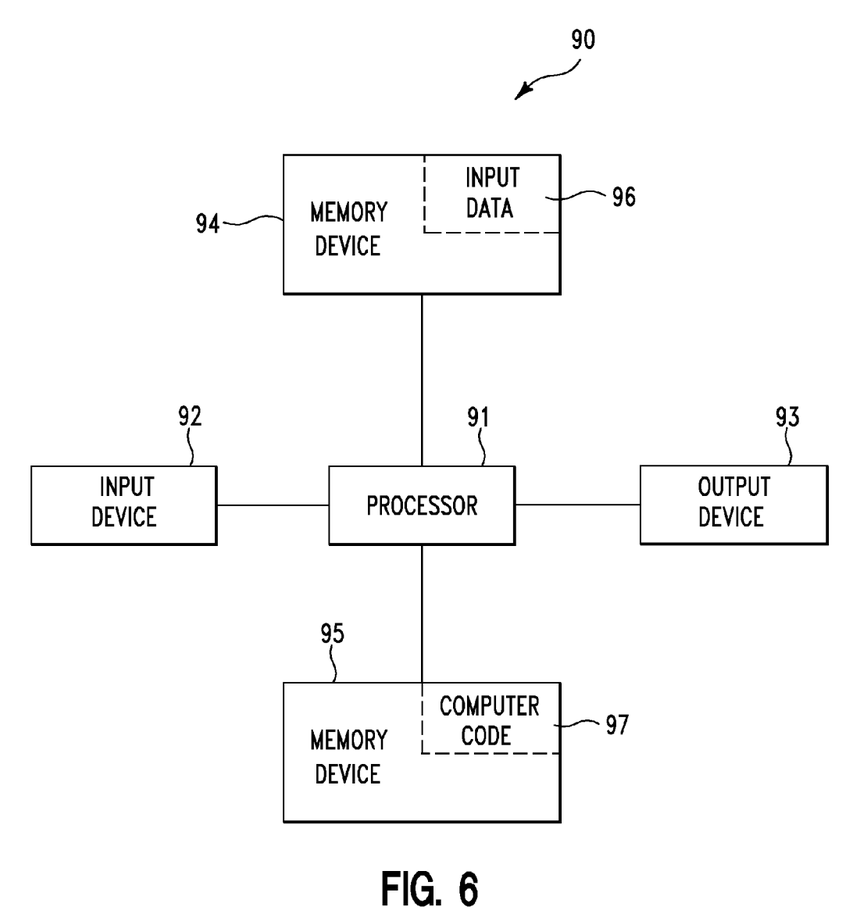
FIG. 6 illustrates a computer apparatus used for creating a business content hierarchy, in accordance with embodiments of the present invention.

FIG. 6 illustrates a computer apparatus 90 used by system 2 of FIG. 1 for creating a business content hierarchy, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for creating a business content hierarchy. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to create a business content hierarchy. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for creating a business content hierarchy. In another embodiment, the invention provides a business method that performs the process steps of the invention on a subscription, advertising, and/or fee basis. That is, a service supplier, such as a Solution Integrator, could offer to create a business content hierarchy. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   extracting, by a computer processor of a computing system from a plurality of documents, content, wherein said extracting said content comprises:
      performing, by said computer processor, a text analytics process with respect to said plurality of documents;
      presenting, by said computer processor, a first screen interface comprising a metrics search menu, wherein said first screen interface presents a menu indicating a hierarchal order for various metrics;
      enabling, by said first screen interface, a metrics search;
      identifying, by said computer processor based on results of said text analytics process and said metrics search, extraction patterns associated with said content, wherein said extraction patterns comprise metrics and business rules comprising key content types that require sharing among peers;
      presenting, by said computer processor, a second screen interface comprising a concept search menu, wherein said second screen interface presents a menu indicating a hierarchal order for business processes, concepts, metrics, and rules;
      identifying, by said computer processor based on results of said text analytics process and a concept search enabled by said second screen interface, concepts from glossaries;
      extracting, by said computer processor, said concepts from said content in accordance with said extraction patterns; and
      determining, by said computer processor based on results of comparing said concepts to a plurality of specified concepts, new concepts of said concepts;
   presenting, by said computer processor, a third screen interface enabling a process for exporting, importing, and merging metrics, wherein said third screen interface presents a menu indicating identified content sources and content details associated with said content;
   enabling, by said third screen interface, said process for exporting, importing, and merging metrics;
   publishing, by said computer processor based on said enabling said process for exporting, importing, and merging metrics, said content in external glossaries;
   publishing, by said computer processor, said content arranged in a business content hierarchy in a specified format;
   enabling, by said computer processor, said business content hierarchy in a plurality of business related projects; and
   arranging, by said computer processor, updated content associated with said content and said business content hierarchy in said updated business content hierarchy.

2. The method of claim 1, wherein said publishing said business content hierarchy comprises:
   translating, by said computer processor, an XML version of said business content hierarchy into a DHTML format using an XSL process; and
   displaying, by said computer processor, said content as a tree structure or an alphabetical structure.

3. The method of claim 1, wherein said publishing said business content hierarchy comprises:
   translating, by said computer processor, an XML version of said business content hierarchy into a DHTML format using an XSL process; and
   generating, by said computer processor, a document comprising said content presented as a tree structure or an alphabetical structure.

4. The method of claim 1, wherein said publishing said enabling said business content hierarchy in said plurality of projects comprises:
- performing a read only operation, by said computer processor, associated with an XML version of said business content hierarchy; and
- retrieving, by said computer processor, details associated with said content.

5. The method of claim 4, wherein said read only operation comprises an operation selected from the group consisting of searching, zooming, and highlighting.

6. The method of claim 1, wherein said updating said content and said business content hierarchy comprises:
- loading, by said computer processor, a selected file associated with said content;
- translating, by said computer processor, an XML version of said selected file into a DHTML format using an XSL process; and
- importing, by said computer processor, additional content associated with said selected file.

7. The method of claim 1, wherein said updating said content and said business content hierarchy comprises:
- loading, by said computer processor, selected node content associated with said content;
- applying, by said computer processor, pagination to said selected node content;
- presenting, by said computer processor via an explorer export window, business content of said selected node content;
- receiving, by said computer processor from a user, a selection for specific content of said business content;
- exporting, by said computer processor to an external location, said specific content.

8. The method of claim 1, wherein said updating said content and said business content hierarchy comprises:
- loading, by said computer processor, a selected file associated with said content;
- translating, by said computer processor, an XML version of said selected file into a DHTML format using an XSL process; and
- adding, by said computer processor, additional content associated with said selected file.

9. The method of claim 1, further comprising:
- providing a process for supporting a computer infrastructure, said process comprising providing at least one support service for at least one of creating, integrating, hosting, maintaining, and deploying computer-readable code in the computing system, wherein the code in combination with the computing system performs the method of claim 1.

10. A computing system comprising a computer processor coupled to a computer-readable memory unit, said memory unit comprising instructions that when executed by the computer processor implements a method comprising:
- extracting, by said computer processor from a plurality of documents, content, wherein said extracting said content comprises:
  - performing, by said computer processor, a text analytics process with respect to said plurality of documents;
  - presenting, by said computer processor, a first screen interface comprising a metrics search menu, wherein said first screen interface presents a menu indicating a hierarchal order for various metrics;
  - enabling, by said first screen interface, a metrics search;
  - identifying, by said computer processor based on results of said text analytics process and said metrics search, extraction patterns associated with said content, wherein said extraction patterns comprise metrics and business rules comprising key content types that require sharing among peers;
  - presenting, by said computer processor, a second screen interface comprising a concept search menu, wherein said second screen interface presents a menu indicating a hierarchal order for business processes, concepts, metrics, and rules;
  - identifying, by said computer processor based on results of said text analytics process and a concept search enabled by said second screen interface, concepts from glossaries;
  - extracting, by said computer processor, said concepts from said content in accordance with said extraction patterns; and
  - determining, by said computer processor based on results of comparing said concepts to a plurality of specified concepts, new concepts of said concepts;
- presenting, by said computer processor, a third screen interface enabling a process for exporting, importing, and merging metrics, wherein said third screen interface presents a menu indicating identified content sources and content details associated with said content;
- enabling, by said third screen interface, said process for exporting, importing, and merging metrics;
- publishing, by said computer processor based on said enabling said process for exporting, importing, and merging metrics, said content in external glossaries;
- publishing, by said computer processor, said content arranged in a business content hierarchy in a specified format;
- enabling, by said computer processor, said business content hierarchy in a plurality of business related projects; and
- arranging, by said computer processor, updated content associated with said content and said business content hierarchy in said updated business content hierarchy.

11. The computing system of claim 10, wherein said publishing said business content hierarchy comprises:
- translating, by said computer processor, an XML version of said business content hierarchy into a DHTML format using an XSL process; and
- displaying, by said computer processor, said content as a tree structure or an alphabetical structure.

12. The computing system of claim 10, wherein said publishing said business content hierarchy comprises:
- translating, by said computer processor, an XML version of said business content hierarchy into a DHTML format using an XSL process; and
- generating, by said computer processor, a document comprising said content presented as a tree structure or an alphabetical structure.

13. The computing system of claim 10, wherein said publishing said enabling said business content hierarchy in said plurality of projects comprises:
- performing a read only operation, by said computer processor, associated with an XML version of said business content hierarchy; and
- retrieving, by said computer processor, details associated with said content.

14. The computing system of claim 13, wherein said read only operation comprises an operation selected from the group consisting of searching, zooming, and highlighting.

15. The computing system of claim 10, wherein said updating said content and said business content hierarchy comprises:

loading, by said computer processor, a selected file associated with said content;

translating, by said computer processor, an XML version of said selected file into a DHTML format using an XSL process; and importing, by said computer processor, additional content associated with said selected file.

16. The computing system of claim 10, wherein said updating said content and said business content hierarchy comprises:

loading, by said computer processor, selected node content associated with said content;

applying, by said computer processor, pagination to said selected node content;

presenting, by said computer processor via an explorer export window, business content of said selected node content;

receiving, by said computer processor from a user, a selection for specific content of said business content;

exporting, by said computer processor to an external location, said specific content.

17. The computing system of claim 10, wherein said updating said content and said business content hierarchy comprises:

loading, by said computer processor, a selected file associated with said content;

translating, by said computer processor, an XML version of said selected file into a DHTML format using an XSL process; and adding, by said computer processor, additional content associated with said selected file.

18. A computer program product, comprising a computer readable hardware storage device storing a computer readable program code, said computer readable program code comprising an algorithm that when executed by a computer processor of a computing system implements a method, said method comprising:

extracting, by said computer processor from a plurality of documents, content, wherein said extracting said content comprises:

performing, by said computer processor, a text analytics process with respect to said plurality of documents;

presenting, by said computer processor, a first screen interface comprising a metrics search menu, wherein said first screen interface presents a menu indicating a hierarchal order for various metrics;

enabling, by said first screen interface, a metrics search;

identifying, by said computer processor based on results of said text analytics process and said metrics search, extraction patterns associated with said content, wherein said extraction patterns comprise metrics and business rules comprising key content types that require sharing among peers;

presenting, by said computer processor, a second screen interface comprising a concept search menu, wherein said second screen interface presents a menu indicating a hierarchal order for business processes, concepts, metrics, and rules;

identifying, by said computer processor based on results of said text analytics process and a concept search enabled by said second screen interface, concepts from glossaries;

extracting, by said computer processor, said concepts from said content in accordance with said extraction patterns; and determining, by said computer processor based on results of comparing said concepts to a plurality of specified concepts, new concepts of said concepts;

presenting, by said computer processor, a third screen interface enabling a process for exporting, importing, and merging metrics, wherein said third screen interface presents a menu indicating identified content sources and content details associated with said content;

enabling, by said third screen interface, said process for exporting, importing, and merging metrics;

publishing, by said computer processor based on said enabling said process for exporting, importing, and merging metrics, said content in external glossaries;

publishing, by said computer processor, said content arranged in a business content hierarchy in a specified format;

enabling, by said computer processor, said business content hierarchy in a plurality of business related projects; and arranging, by said computer processor, updated content associated with said content and said business content hierarchy in said updated business content hierarchy.

19. The computer program product of claim 18, wherein said publishing said business content hierarchy comprises:

translating, by said computer processor, an XML version of said business content hierarchy into a DHTML format using an XSL process; and displaying, by said computer processor, said content as a tree structure or an alphabetical structure.

20. The computer program product of claim 18, wherein said publishing said business content hierarchy comprises:

translating, by said computer processor, an XML version of said business content hierarchy into a DHTML format using an XSL process; and generating, by said computer processor, a document comprising said content presented as a tree structure or an alphabetical structure.

* * * * *